US008862321B2

(12) United States Patent
Moshchuk et al.

(10) Patent No.: US 8,862,321 B2
(45) Date of Patent: Oct. 14, 2014

(54) DIRECTING VEHICLE INTO FEASIBLE REGION FOR AUTONOMOUS AND SEMI-AUTONOMOUS PARKING

(75) Inventors: Nikolai K. Moshchuk, Grosse Pointe, MI (US); Bakhtiar Brian Litkouhi, Washington, MI (US); Shih-Ken Chen, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 118 days.

(21) Appl. No.: 13/586,077

(22) Filed: Aug. 15, 2012

(65) Prior Publication Data
US 2014/0052336 A1 Feb. 20, 2014

(51) Int. Cl.
B60G 17/018 (2006.01)
B62C 3/00 (2006.01)
B62D 5/04 (2006.01)

(52) U.S. Cl.
CPC .................................. *B62D 5/0463* (2013.01)
USPC .......................................................... 701/40

(58) Field of Classification Search
CPC ..................................................... B62D 5/0463
USPC .......................................................... 701/41
See application file for complete search history.

(56) References Cited

U.S. PATENT DOCUMENTS

| 4,735,274 | A | | 4/1988 | Good et al. |
| 5,680,313 | A | * | 10/1997 | Whittaker et al. ............ 701/300 |
| 5,742,141 | A | | 4/1998 | Czekaj |
| 5,748,107 | A | | 5/1998 | Kersken et al. |
| 6,483,442 | B2 | | 11/2002 | Shimizu et al. |
| 6,564,123 | B2 | | 5/2003 | Hahn et al. |
| 6,654,670 | B2 | * | 11/2003 | Kakinami et al. ................ 701/1 |
| 6,906,640 | B2 | | 6/2005 | Gotzig et al. |
| 6,948,729 | B2 | | 9/2005 | Zalila et al. |
| 7,486,203 | B2 | | 2/2009 | Tanaka et al. |
| 7,519,922 | B2 | | 4/2009 | Obradovich |
| 7,528,740 | B2 | * | 5/2009 | Hess et al. ................. 340/932.2 |
| 7,940,193 | B2 | * | 5/2011 | Yamanaka ................. 340/932.2 |
| 8,035,531 | B2 | * | 10/2011 | Yoshihashi et al. ........ 340/932.2 |
| 8,049,778 | B2 | * | 11/2011 | Kuboyama et al. ........... 348/118 |
| 8,056,667 | B2 | | 11/2011 | Moshchuk et al. |

(Continued)

OTHER PUBLICATIONS

Oliver Buhler and Joachim Wegener, Automatic Testing of an Autonomous parking System using Evolutionary Computation, SAE 2004-01-0459, http://www.systematic-testing.com/documents/final_paper.pdf, 2004.

(Continued)

*Primary Examiner* — Mary Cheung
*Assistant Examiner* — Frederick Brushaber

(57) ABSTRACT

A method of guiding a vehicle to a region for initiating a parallel parking maneuver. A region of feasible starting locations for successfully performing a parallel parking maneuver is determined by a processor. A position of the vehicle relative to the region of feasible starting locations is determined. A determination is made whether the vehicle is in a zero heading position. The vehicle is guided along an initial target path by controlling a steering actuator until the vehicle is in a zero heading position relative to the road of travel in response to the vehicle is not in the zero heading position. A planned path is generated that includes two arc-shaped trajectories extending between the vehicle at the zero heading position and a position within the region of feasible starting locations as determined by the processor. The steering actuator is controlled to follow the planned path to the feasible region.

21 Claims, 5 Drawing Sheets

(56) References Cited

U.S. PATENT DOCUMENTS

| | | | |
|---|---|---|---|
| 8,065,058 B2 | 11/2011 | Lüke | |
| 8,098,174 B2 | 1/2012 | Moshchuk et al. | |
| 8,099,214 B2 | 1/2012 | Moshchuk et al. | |
| 8,326,492 B2* | 12/2012 | Schoening et al. | 701/42 |
| 8,487,783 B2* | 7/2013 | Yoshihashi et al. | 340/932.2 |
| 8,498,770 B2* | 7/2013 | Takano | 701/28 |
| 2004/0130464 A1* | 7/2004 | Schindler et al. | 340/932.2 |
| 2007/0088478 A1* | 4/2007 | Mori et al. | 701/41 |
| 2008/0125939 A1* | 5/2008 | Luke | 701/41 |
| 2010/0106372 A1* | 4/2010 | Watanabe et al. | 701/41 |
| 2010/0114434 A1* | 5/2010 | Kawabata et al. | 701/41 |
| 2011/0156928 A1* | 6/2011 | Ghisio et al. | 340/932.2 |
| 2011/0181441 A1* | 7/2011 | Ma et al. | 340/932.2 |

OTHER PUBLICATIONS

R. Holve, P. Protzel, Reverse Parking of a Model Car with Fuzzy Control, http://citeseerx.ist.psu.edu/viewdoc/download?doi=10.1.1.67.5489&rep1&type=pdf, Sep. 1996, pp. 2171-2175.

C. Pradalier, S. Vaussier and P. Corke, Path Planning for a Parking Assistance System: Implementation and Experimentation, 2003.

Igor E. Paromtchik and Christian Laugier, Autonomous Parallel Parking of a Nonholonomic Vehicle, 0-7803-3652 IEEE, 1996.

Zvi Shiller and Satish Sundar, Emergency Maneuvers for AHS Vehicles, SAE 951893, Aug. 7-10, 1995, pp. 1-11.

* cited by examiner

DIRECTING VEHICLE INTO FEASIBLE REGION FOR AUTONOMOUS AND SEMI-AUTONOMOUS PARKING

BACKGROUND OF INVENTION

An embodiment relates generally to parallel parking of a vehicle.

Parallel parking a vehicle between two vehicles is often a difficult task for a driver. Semi-autonomous parking systems aid the driver in performing difficult parking maneuvers such as parallel parking. Such systems either guide the driver in steering the vehicle through its intended trajectory path or increase/decrease power steering efforts when the driver of the vehicle has deviated from the intended trajectory path. In such systems, an intended trajectory path is determined based on the available space between a pair of objects. However, such paths are often determined for a predetermined point where the vehicle must be located to initiate the parking maneuver. That is, the intended trajectory path may be determined for a position other than where the vehicle is actually located. As a result, based on the location and/or orientation of the vehicle, the determined intended trajectory path may not be suitable for parallel parking the vehicle based on the vehicle's current location/orientation.

SUMMARY OF INVENTION

An advantage of an embodiment is the maneuvering of a vehicle to a feasible region of starting locations for initiating a parallel parking maneuver. The feasible region identifies a region for where a vehicle can initiate a successful parking maneuver; however, the vehicle must be located within the feasible region to initiate the parallel parking maneuver. As a result, the embodiments herein describe the maneuvering of the vehicle from a current position to a region of feasible starting locations. This avoids the driver receiving a message that the parking maneuver is not feasible and looking for a next available parking space. That is, rather than just actuating a message identifying that the vehicle cannot be parked, the system autonomously or semi-autonomously guides the vehicle from a current position to the region of feasible starting locations. If obstacles are encountered, then the system attempts to reconfigure the target path for maneuvering the vehicle to the region of feasible starting locations.

An embodiment contemplates a method of guiding a vehicle to a region for initiating a parallel parking maneuver. A region of feasible starting locations is determined for successfully performing a parallel parking maneuver by a processor. A position of the vehicle is determined relative to the region of feasible starting locations if the vehicle is not within the region of feasible starting locations. A determination is made whether the vehicle is in a zero heading position relative to the road of travel. The vehicle is guided along an initial target path by controlling a steering actuator until the vehicle is in a zero heading position relative to the road of travel in response to the determination that the vehicle is not initially in the zero heading position. A planned path is generated that includes two arc-shaped trajectories extending between the vehicle at the zero heading position and a position within the region of feasible starting locations as determined by the processor. The steering actuator is controlled to follow the planned path to the region of feasible starting locations.

An embodiment contemplates an autonomous parking system for parallel parking a driven vehicle. A steering module autonomously pivots steerable wheels of the vehicle. A processor communicates with the steering module for autonomously controlling the pivoting wheels of the vehicle. A sensing device detects objects proximate to the driven vehicle. The sensing device communicates with the controller for identifying an available parking space. The sensing device further detects obstacles in a driven path of the vehicle. The processor determines a region of feasible starting locations to successfully perform a parallel parking maneuver by a processor. The processor determines a position of the vehicle relative to the region of feasible starting locations if the vehicle is not within the region of feasible starting locations. The processor determines whether the vehicle is in a zero heading position relative to the road of travel. The processor and steering module cooperatively guide the vehicle along an initial target path until the vehicle is in a zero heading position relative road of travel in response to determining that the vehicle is not in the zero heading position. The processor generates a planned path that includes two arc-shaped trajectories that extend between the vehicle at the zero heading position and a position within the region of feasible starting locations as determined by the processor. The processor controls the steering module to follow the planned path to the region of feasible starting locations.

DETAILED DESCRIPTION

Figure 1:
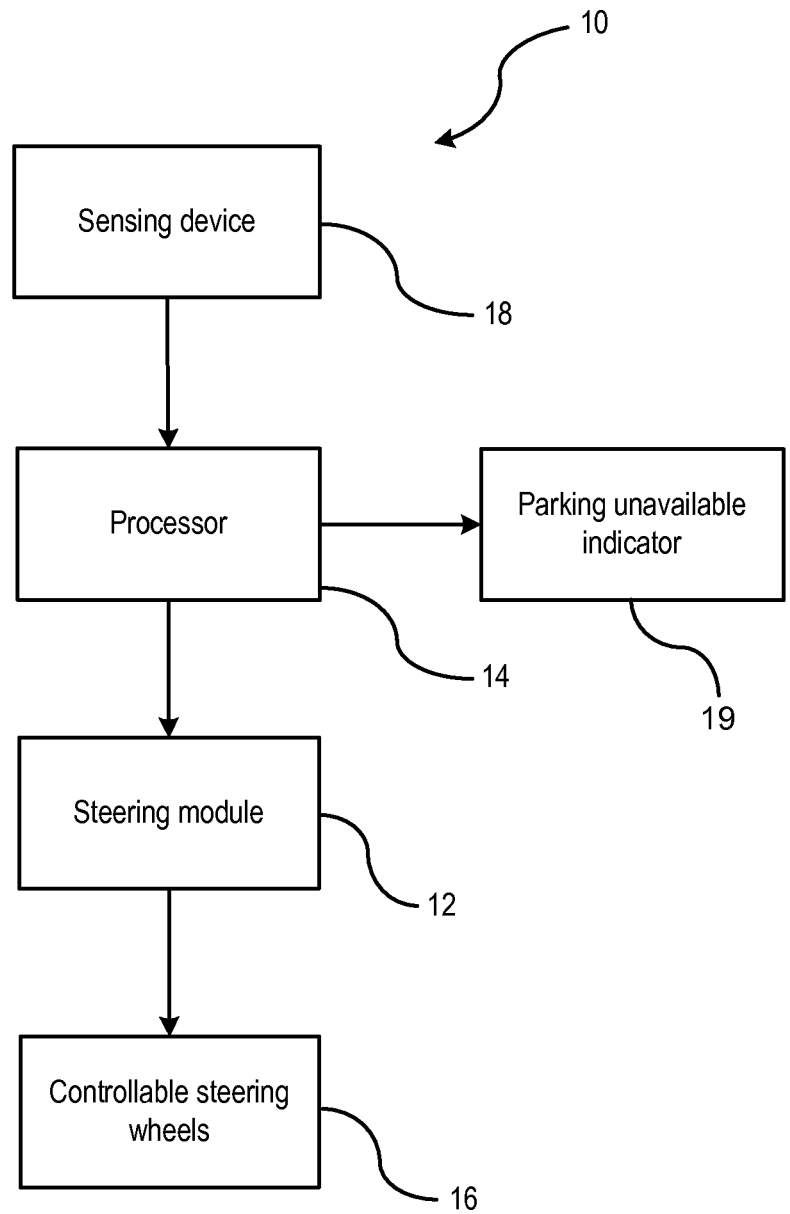
FIG. 1 is a block diagram illustrating an autonomous parallel parking system.

There is shown in FIG. 1 an embodiment of an autonomous steering system 10 for parallel parking a vehicle 20. The autonomous steering system 10 includes a steering module 12 and a processor 14 for controlling steerable wheels 16 of the vehicle. The steering module 12 may be an electronic module or similar device that is capable of turning the steerable wheels 16 without a driver's steering demand via a steering wheel of the vehicle. The processor 14 provides control input signals to the steering module 12, such as a conventional electronic power steering module, for controlling the turning of the steerable wheels during a parking maneuver. The processor 14 may be separate from the steering module 12 or may be integrated within the steering module 12 as a single unit. It should be understood that the system and techniques described herein also apply to semi-autonomous steering systems.

The autonomous steering system 10 further includes a sensing device 18 for detecting objects proximate to the driven vehicle. The sensing device 18 detects the presence and non-presence of objects laterally from the vehicle for determining target parking space between a first object and a second object. The sensing device 18 may include a radar-based sensing device, an ultrasonic-based sensing device, an imaging-based sensing device, or similar device capable of providing a signal characterizing the available space between the objects. The sensing device 18 is in communication with the processor 14 for providing signals to the processor 14. The sensing device 18 may be capable of determining the distance between the respective objects and communicating the determined distance to the processor 14, or the sensing device 18 may provide signals to the processor 14 to be used by the processor 14 to determine the distance of the spacing between the objects.

A parking unavailable indicator 19 is provided for indicating when parallel parking cannot be executed. Actuation of the parking unavailable indicator 19 may be the result of insufficient space between a set of objects, obstacles in a path of the vehicle, or infeasibility of performing a parking maneuver. In response to an available parking space between the first and second objects, processor 14 determines whether to apply a parking strategy for parking the vehicle between a first object and a second object (e.g., one cycle parking strategy, two parking strategy).

A routine for determining whether a vehicle can be parked in an available parking space utilizing a respective parking strategy is described in a U.S. Pat. No. 8,056,667 issued on Nov. 15, 2011, which is incorporated by reference in its entirety. The routine determines a first minimum length for parking the vehicle using a one cycle parallel parking strategy and a second minimum length for parking the vehicle using a two cycle parallel parking strategy based on the available parking space between the first object and second object. Another routine for determining a path planning trajectory for parallel parking the vehicle based on the available parking space utilizing either a respective parking strategy is described U.S. Pat. No. 8,099,214 issued on Jan. 17, 2012, which is incorporated by reference in its entirety. It should be understood that an embodiment as described herein may be utilized with other methods which determine the available parking space between the two objects in addition to a method which determines the intended trajectory for parallel parking the vehicle.

Figure 2:
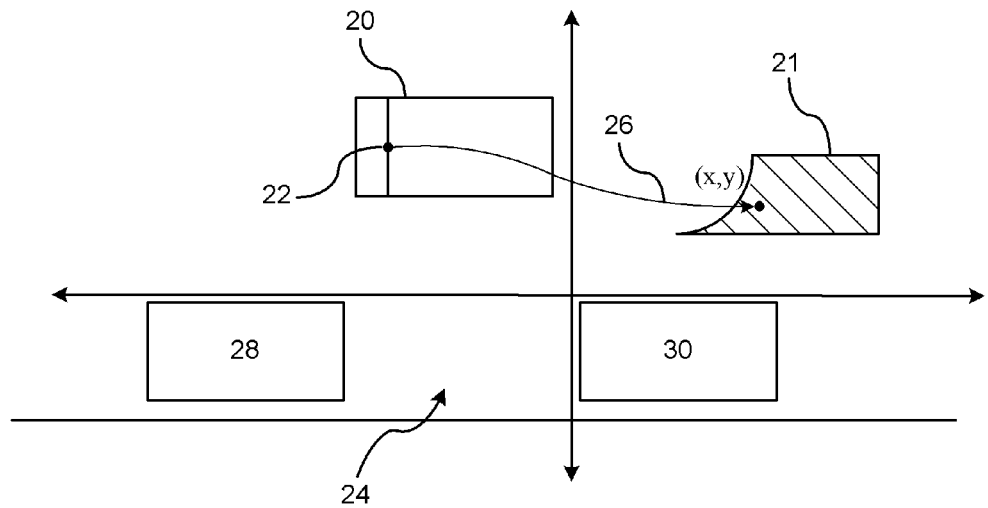
FIG. 2 is an exemplary planned path for transitioning to a feasible region for initiating a parallel parking maneuver.

FIG. 2 illustrates a vehicle 20 transitioning to a feasible region 21 for initiating a parallel parking maneuver. The designated region 21 is an area in which the rear axle midpoint 22 of the vehicle 20 must be positioned in order to initiate execution of the parallel parking maneuver to a final position 24 utilizing a respective parking strategy. The designated region 21 has a boundary that is defined by segments. An example of a region of feasible starting locations is described in U.S. Pat. No. 8,098,174, issued on Jan. 17, 2012, which is incorporated by reference in its entirety. The region of feasible starting locations is determined by the processor identified in FIG. 1 given the input data from the sensing devices.

In response to determining the region of feasible starting locations 21, the processor determines a current position of the vehicle relative to the region of feasible starting locations 21. If the vehicle is not within the region of feasible starting locations 21, then the vehicle determines whether the vehicle is in a zero heading position relative to the road of travel. If the vehicle is in a zero heading position relative to the road of travel, then the processor determines whether a planned path can be generated for the vehicle to transition to the region of feasible starting locations 21. If the vehicle is at a zero heading position, a planned path 26 is determined. The planned path 26 includes two arc-shaped trajectories extending between a current position of the vehicle at the zero heading and a position within the region of feasible starting locations (x, y). A vehicle's position is based on the position of the mid-point of the rear axle of the vehicle 22. The processor controls the steering module (e.g., steering actuator) for guiding the vehicle 20 along the planned path 26. The arc-shaped trajectories extending between the current position of the vehicle 20 at zero heading position and a position with the region of feasible starting locations (x, y) form clothoids. The planned path 26 is a forward driven plan path and includes a clockwise steering maneuver and a counterclockwise steering maneuver for guiding the vehicle to the region of feasible starting locations 21. Depending upon the relative position of the vehicle 20 to the region of feasible starting locations 21, a clockwise or counterclockwise steering maneuver may first be initiated followed by counterclockwise or clockwise steering maneuver.

Figure 3:
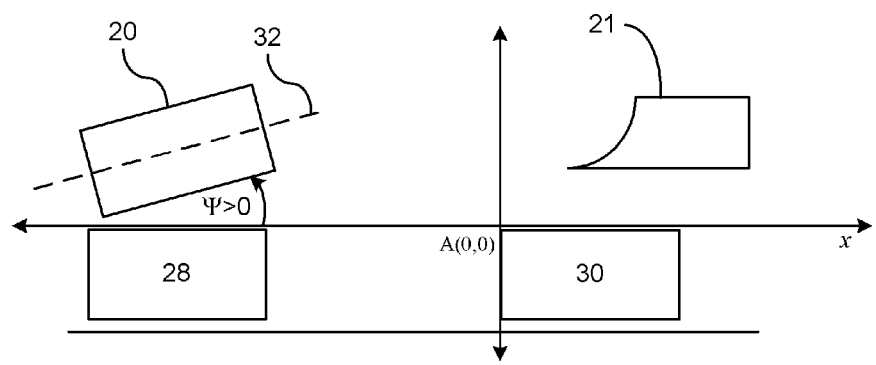
FIG. 3 is a diagrammatic view illustrating an exemplary vehicle heading position substantially greater than a zero heading position.
Figure 4:
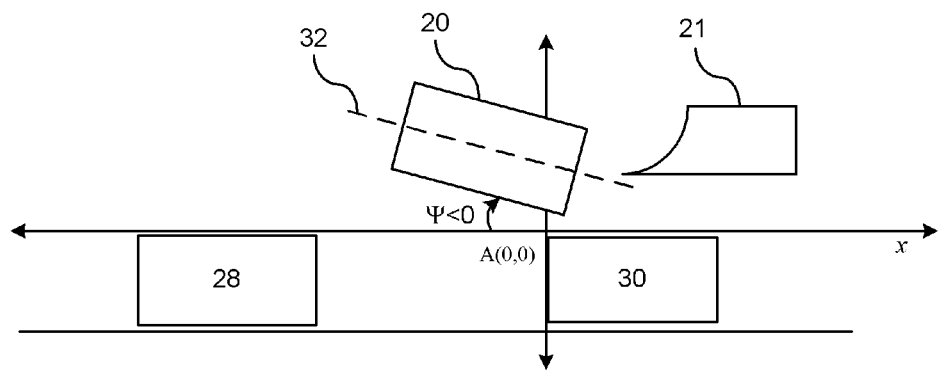
FIG. 4 is a diagrammatic view illustrating an exemplary vehicle heading position substantially less than a zero heading position.

FIGS. 3 and 4 illustrate vehicle positions when the vehicle is at a heading other than substantially a zero heading position. The term zero heading position is based on an orientation of the vehicle 20 relative to the road of travel. The parked vehicles 28 and 30 which the vehicle 20 is attempting to park therebetween are also assumed to be substantially parallel to the road of travel. Therefore, the zero heading position is relative to the road of travel and the heading of the parked vehicles 28 and 30. As shown in FIG. 3, the heading position of the vehicle 20 is identified as the angle between the imaginary x-axis extending parallel to the road of travel and a longitudinal centerline 32 of the vehicle. FIG. 3 illustrates vehicle heading substantially greater than a zero heading ($\psi$>0). Similarly, in FIG. 4, the heading of the vehicle 20 is substantially less than a zero heading ($\psi$<0). It should be understood that the term zero heading position includes a respective degree of deviation from a true zero heading position. As a result, the term zero heading position is position that has some +/− degree of deviation (e.g., +/−5 degrees) from a true zero heading position. Therefore, the planned path as illustrated in FIG. 2 is generated based on the assumption that the vehicle 20 is at a substantially zero heading position ($\psi \approx 0$) (i.e., within a respective degree from a true zero heading position). As a result, the vehicle 20 must be repositioned to a zero heading position prior to determining the planned path.

Figure 5:
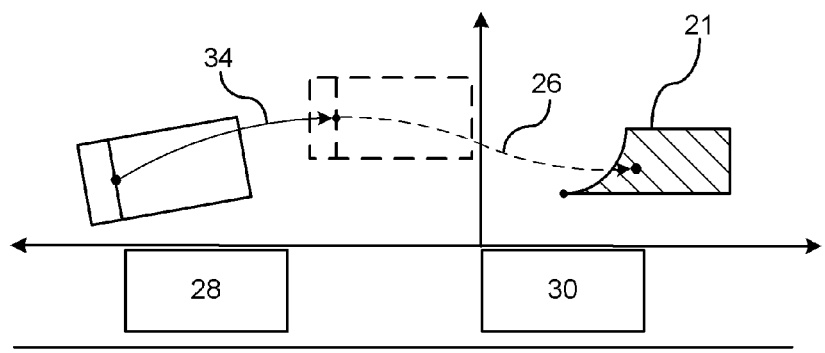
FIG. 5 is a diagrammatic view illustrating a vehicle having a heading position transitioning along a first target path in a first direction.

FIG. 5 illustrates a vehicle having an initial vehicle heading substantially greater than zero. In response to the processor determining that the vehicle is not in the region of feasible starting location 21 and that the vehicle heading position is not zero, then processor determines an initial target path 34 for repositioning the vehicle 20 to a zero heading position. The target path and planned path, as described earlier, forms clothoids and the maximum radius of path curvature for forming the clothoids is predefined and is based on a concrete vehicle turning radius. Moreover, a maximum rate of change of the path curvature is limited. The processor in cooperation with the steering module guides the vehicle along the initial target path 34 until a zero heading position is obtained. Once the zero heading position is obtained by the vehicle 20, the processor generates a planned path 26 for guiding the vehicle 20 to the region of feasible starting locations 21. Once the midpoint of the rear axle 22 is within the region of feasible starting locations 21, the processor can then determine a steering strategy for parallel parking the vehicle between the parked vehicles 28 and 30.

Figure 6:
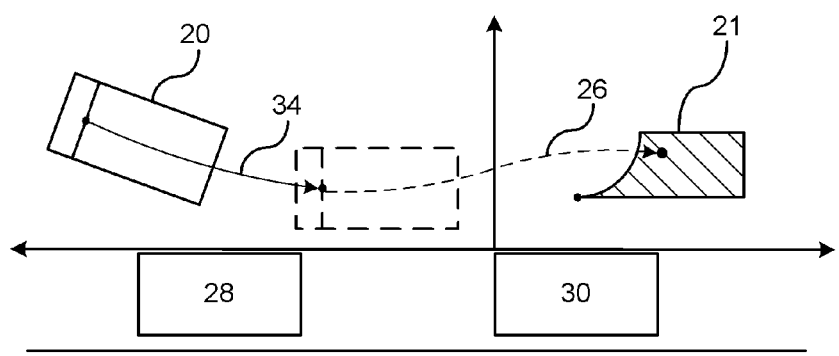
FIG. 6 is a diagrammatic view illustrating a vehicle having a heading position transitioning along second target path in the first direction.

FIG. 6 illustrates a vehicle having a vehicle heading substantially less than zero. Similar to the technique described in FIG. 5, an initial target path 34 is determined for moving the vehicle 20 to a substantially zero heading. Once the heading of the vehicle 20 is zero, the processor determines the planned path 26 for directing the vehicle to a position within the region of feasible starting locations 21. Thereafter, the processor determines a steering strategy for parallel parking the vehicle between the parked vehicles 28 and 30.

Figure 7:
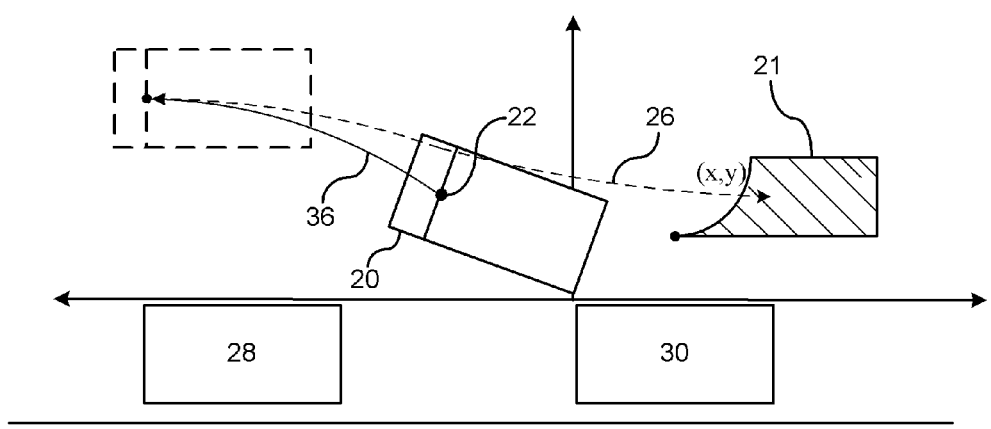
FIG. 7 is a diagrammatic view illustrating a vehicle having a heading position transitioning along third target path in a second direction.

FIG. 7 illustrates a condition where an obstacle prevents the vehicle 20 from moving to a first an initial zero heading position. Due to the proximity of the vehicle 20 in relation to the parked object 30, vehicle 20 cannot utilize an initial target path that utilizes a forward driven direction for directing the vehicle to a zero heading position. As result of the obstruction of parked vehicle 30, vehicle 20 determines a next target path 36 for moving the vehicle to a next zero heading position using a reverse direction. The vehicle 20 senses whether any obstacles are present if the vehicle is moved in a reverse direction. If an obstacle is not present, then the next target path is generated by the processor for guiding the vehicle in a reverse direction. Once the vehicle has reached the zero heading position utilizing the reverse direction, the processor determines a planned path 26 for guiding the vehicle 20 to a respective position within the region of feasible starting locations 21. Once the midpoint of the rear axle 22 reaches the respective position within the region of feasible starting locations 21, the processor determines a steering strategy for parking the vehicle between the parked vehicles 28 and 30. It should be understood that the processor may initially determine an initial target path utilizing a forward or reverse direction, and if an obstacle is present preventing vehicle from reaching a zero heading position utilizing the selected direction, then the opposing direction not initially selected is used to generate a next target path for determining whether such the path is feasible.

If an obstacle is preventing vehicle 20 from moving to a zero heading position in both the forward and the reverse direction, then the parking unavailable indicator is actuated for identifying that parking the vehicle is not feasible at the current time. The parking unavailable indicator may be output to the driver so the driver is aware of the condition, or parking unavailable actuator may be provided to the autonomous parking system where the system utilizes the information in such a manner as to indicate the infeasible parking condition. The parking unavailable indicator may be a visual indicator, audible indicator, or a haptic indicator. The parking unavailable indicator may also be a signal to a vehicle application that utilizes this information to perform a next action.

Figure 8:
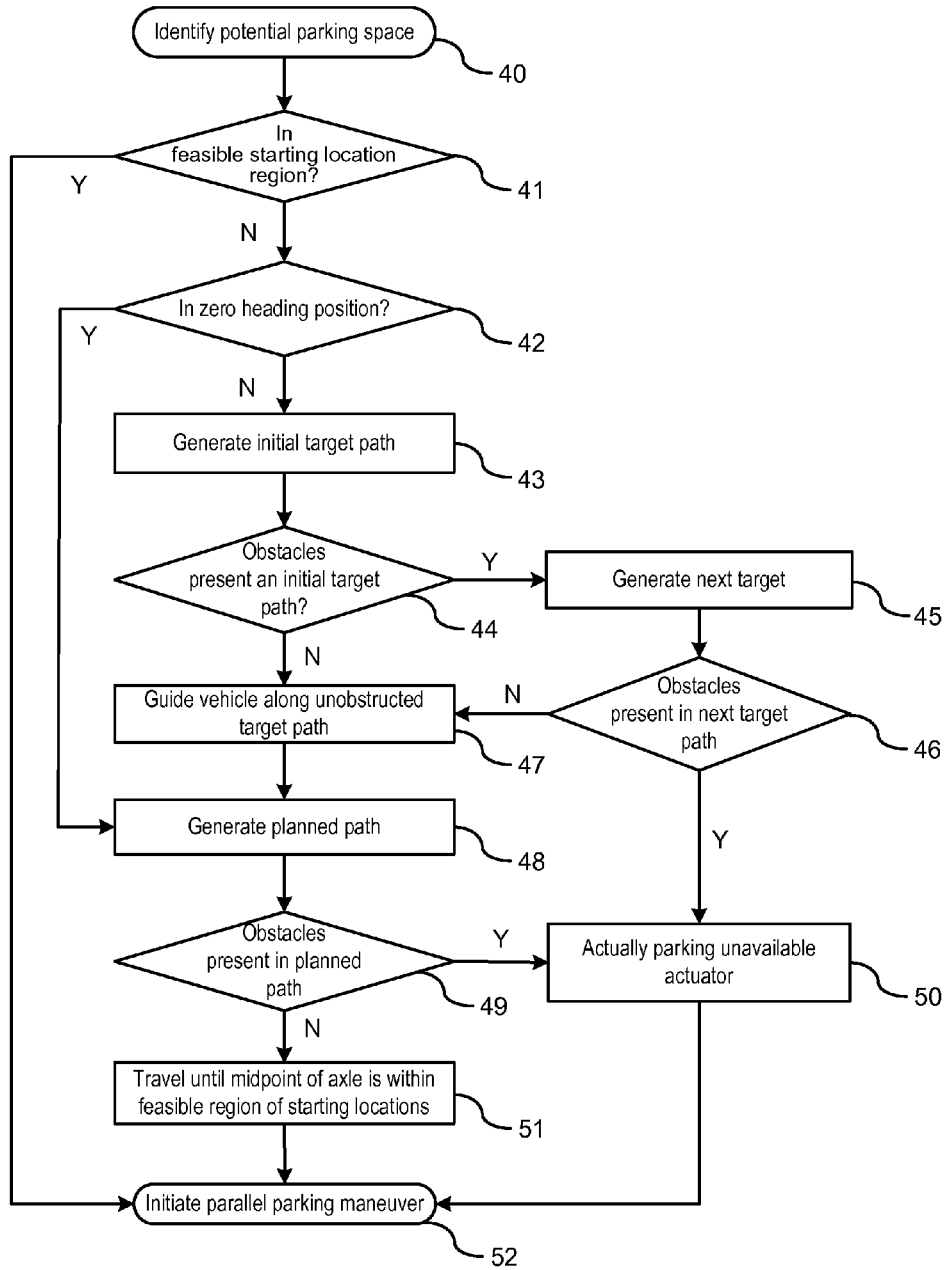
FIG. 8 is a flowchart of a method for guiding the vehicle to a region of feasible starting locations.

FIG. 8 illustrates a flowchart of a method moving the vehicle to the region of feasible starting locations. In step 40, a potential parking space between parked vehicles or two objects are identified. It is understood that the determination of the space required for parking the vehicle between the two parked vehicles may be determined by any technique.

In step 41, a determination is made as to whether the vehicle is in the region of feasible starting locations. If the vehicle is within the feasible region, then the routine exits and a steering maneuver routine is executed for initiating a parallel parking maneuver from the feasible region. If vehicle is not in the feasible region, then the routine proceeds to step 42.

In step 42, a determination is made whether the vehicle is in a zero heading position. If the vehicle is in a zero heading position, then the routine proceeds to step 48. If the vehicle is not in a zero heading position, then the routine proceeds to step 43.

In step 43, an initial target path is generated for guiding the vehicle into a zero heading position while driving in a respective direction (e.g., forward driven direction).

In step 44, a determination is made as to whether any obstacles are present in the initial target path determined in step 43. If an obstacle is present, then the routine proceed to step 45; otherwise the routine proceeds to step 47.

In step 45, a next target path is generated in the opposite direction as utilized in step 43 (e.g., reverse driven direction).

In step 46, a determination is made as to whether any obstacles are present in the next target path determined in step 45. If no obstacle is present, then the routine proceed to step 47; otherwise the routine proceeds to step 50.

In step 47, the vehicle is guided along the unobstructed target path identified in either step 43 or step 45. The vehicle is guided along the target path until a zero heading position is obtained.

In step 48, a planned path is generated for guiding the vehicle until the midpoint of the rear axle reaches a determined position within the feasible region.

In step 49, a determination is made whether any obstacles are present in the planned path as determined in step 48. If obstacles are present, then the routine proceeds to step 50 where a parking unavailable actuator is actuated in response to obstacles being present; otherwise the routine proceeds to step 51.

In step 50, the parking unavailable indicator is actuated in response to an obstruction either in the planned path or in both the initial target path and the next target path. The routine thereafter exits in step 52.

In step 51, in response to no obstacles being present in the planned path, the vehicle is guided along the unobstructed planned path as generated in step 48 until a midpoint of the axle reaches determined position within the feasible region. The routine thereafter exits and a parallel parking maneuver routine is initiated for parking the vehicle between the parked vehicles.

While certain embodiments of the present invention have been described in detail, those familiar with the art to which this invention relates will recognize various alternative designs and embodiments for practicing the invention as defined by the following claims.

What is claimed is:

1. A method of guiding a vehicle to a region for initiating a parallel parking maneuver, the method comprising the steps of:
   determining, by a processor, a region of feasible starting locations to successfully perform a parallel parking maneuver, the region of feasible starting locations including a region where the vehicle can feasibly initiate an execution of the parallel parking maneuver to a final parking position;
   determining a position of the vehicle relative to the region of feasible starting locations if the vehicle is not within the region of feasible starting locations;
   determining whether the vehicle is in a zero heading position relative to the road of travel;
   guiding the vehicle along an initial target path by controlling a steering actuator until the vehicle is in a zero heading position relative to the road of travel in response to the determination that the vehicle is not initially in the zero heading position;
   generating, by the processor, a planned path that includes two arc-shaped trajectories extending between the vehicle at the zero heading position and a position within the region of feasible starting locations as determined, the two arc-trajectories including clothoids; and
   controlling the steering actuator to follow the planned path to the region of feasible starting locations.

2. The method of claim 1 wherein the vehicle senses for a presence of an obstacle in the initial target path utilizing one of a forward or reverse direction, and wherein the vehicle is guided along the initial target path in the one of the forward or reverse direction to the zero heading position in response to sensing no obstacle in the initial target path.

3. The method of claim 2 wherein a next target path is generated to a next zero heading position utilizing the other of the forward or reverse direction in response sensing the obstacle in the initial target path, wherein the vehicle senses for a presence of an obstacle in the next target path, and wherein the vehicle is guided along the next target path to the next zero heading position utilizing the other of the forward or reverse direction in response sensing no obstacle in the next target path.

4. The method of claim 3 wherein a parking unavailable indicator is actuated for indicating an infeasible parking location in response to an obstacle being present in both the initial target path and the next target path.

5. The method of claim 1 wherein the planned path includes a forward driven planned path, and wherein the forward planned path includes a clockwise steering maneuver and a counterclockwise steering maneuver for guiding the vehicle to the region of feasible starting locations.

6. The method of claim 5 wherein the vehicle senses whether an obstacle is present in the planned path to the region of feasible starting locations.

7. The method of claim 6 wherein a parking unavailable indicator is actuated for indicating an infeasible parking location in response to the obstacle being present in the planned path.

8. The method of claim 6 wherein the steering actuator is controlled to follow the planned path to the region of feasible starting locations in response to sensing no obstacle in the planned path.

9. The method of claim 1 wherein forming the clothoids includes utilizing a maximum radius of path curvature and a concrete vehicle turning radius.

10. The method of claim 1 wherein the guiding the vehicle along the planned path includes guiding a position of a midpoint of the rear axle of the vehicle along the planned path, and wherein the determination of the vehicle being in the region of feasible starting locations includes determining when midpoint of the rear axle of the vehicle is within the region of feasible starting locations.

11. An autonomous parking system for parallel parking a driven vehicle comprising:
a steering module for autonomously pivoting steerable wheels of the vehicle;
a processor communicating with the steering module for autonomously controlling the pivoting wheels of the vehicle;
a sensing device for detecting objects proximate to the driven vehicle, the sensing device communicating with the controller for identifying an available parking space, the sensing device further detecting obstacles in a driven path of the vehicle;
wherein the processor determines a region of feasible starting locations to successfully perform a parallel parking maneuver by a processor, the region of feasible starting locations including a region where the vehicle can feasibly initiate an execution of the parallel parking maneuver to a final parking position, the processor determining a position of the vehicle relative to the region of feasible starting locations if the vehicle is not within the region of feasible starting locations, the processor determining whether the vehicle is in a zero heading position relative to the road of travel, wherein the processor and steering module cooperatively guide the vehicle along an initial target path until the vehicle is in a zero heading position relative road of travel in response to determining that the vehicle is not in the zero heading position, wherein the processor generates a planned path that includes two arc-shaped trajectories extending between the vehicle at the zero heading position and a position within the region of feasible starting locations as determined by the processor, wherein the two arc-trajectories includes clothoids, and wherein the processor controls the steering module to follow the planned path to the region of feasible starting locations.

12. The autonomous parking system of claim 11 wherein the sensing device senses whether an obstacle is present in the initial target path utilizing one of a forward or reverse direction, and wherein the vehicle is guided along the initial target path in the one of the forward or reverse direction to the zero heading position in response sensing no obstacle in the initial target path.

13. The autonomous parking system of claim 11 wherein the processor generates a next target path to a next zero heading position utilizing the other of the forward or reverse direction in response to sensing the obstacle in the initial target path, wherein the sensing device senses whether an obstacle is present in the next target path utilizing the other of the forward or reverse direction, and wherein the vehicle is guided along the next target path utilizing the other of the forward or reverse direction to the next zero heading position in response sensing no obstacle in the next target path.

14. The autonomous parking system of claim 13 further comprising a parking unavailable indicator, wherein the parking unavailable indicator is actuated to a driver in response to obstacles being present in both the initial target path and the next target path.

15. The autonomous parking system of claim 11 wherein the planned path includes a forward driven planned path, and wherein the forward planned path includes a clockwise steering maneuver and a counterclockwise steering maneuver for guiding the vehicle to the region of feasible starting locations.

16. The autonomous parking system of claim 15 wherein the sensing device senses whether an obstacle is present in the planned path.

17. The autonomous parking system of claim 16 further comprising a parking unavailable indicator, wherein the parking unavailable actuator is actuated in response to obstacles being present the planned path.

18. The autonomous parking system of claim 16 wherein the steering actuator is controlled to follow the planned path to the region of feasible starting locations in response to sensing no obstacle in the planned path.

19. The autonomous parking system of claim 11 wherein the clothoids are formed utilizing a maximum radius of path curvature and a concrete vehicle turning radius.

20. The autonomous parking system of claim 11 wherein guiding the vehicle along the planned path includes guiding a position of a midpoint of the rear axle of the vehicle along the planned path, and wherein the determination of the vehicle being in the region of feasible starting locations includes determining when the midpoint of the rear axle of the vehicle is within the region of feasible starting locations.

21. The autonomous parking system of claim 11 wherein the clothoids are formed utilizing a maximum radius of path curvature and a concrete vehicle turning radius.

* * * * *